US011493703B2

(12) United States Patent
Cheng et al.

(10) Patent No.: US 11,493,703 B2
(45) Date of Patent: Nov. 8, 2022

(54) LASER DEVICE FOR OPTICAL COMMUNICATION, OPTICAL COMMUNICATION SYSTEM AND USE OF THESE

(71) Applicant: Nederlandse Organisatie voor toegepast-natuurwetenschappelijk onderzoek TNO, 's-Gravenhage (NL)

(72) Inventors: Lun Kai Cheng, Krimpen aan den IJssel (NL); Kristiaan Albert Broekens, Rotterdam (NL); Hendrik De Man, Roosendaal (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/259,633

(22) PCT Filed: Jul. 12, 2019

(86) PCT No.: PCT/NL2019/050439
§ 371 (c)(1),
(2) Date: Jan. 12, 2021

(87) PCT Pub. No.: WO2020/013697
PCT Pub. Date: Jan. 16, 2020

(65) Prior Publication Data
US 2021/0318500 A1    Oct. 14, 2021

(30) Foreign Application Priority Data
Jul. 12, 2018  (EP) .................................... 18183154

(51) Int. Cl.
*H04B 10/11*        (2013.01)
*H04B 10/50*        (2013.01)
(Continued)

(52) U.S. Cl.
CPC ........... *G02B 6/4213* (2013.01); *G02F 1/353* (2013.01); *H01S 3/2316* (2013.01); *H04B 10/11* (2013.01);
(Continued)

(58) Field of Classification Search
CPC .............................................. H04B 10/11–118
(Continued)

(56) References Cited

U.S. PATENT DOCUMENTS 5,365,239 A * 11/1994 Stilwell, Jr. .......... H01Q 3/2676
342/368
5,974,074 A * 10/1999 Mayor ................... H04B 10/11
359/338

(Continued)

OTHER PUBLICATIONS

European Patent Office, International Search Report in corresponding International Application No. PCT/NL2019/050439, dated Oct. 14, 2019 (2 pages).

*Primary Examiner* — Li Liu
(74) *Attorney, Agent, or Firm* — Leydig, Voit & Mayer, Ltd.

(57) ABSTRACT

A laser device for optical communication comprises a first laser unit connected to a first optical fiber for supplying a transmission laser beam thereto. wherein the laser device is configured for providing a reference laser beam in addition to the transmission laser beam. For providing the reference laser beam the laser device further includes a second laser unit connected to a second optical fiber for supplying the reference laser beam to the second optical fiber. The first laser unit is configured for providing the transmission laser beam as a linear polarized beam that is polarized in a first polarization direction, and the second laser unit is configured for providing the reference laser beam as a linear polarized beam that is polarized in a second polarization direction. The first optical fiber and the second optical fiber
(Continued)

are formed of polarization maintaining optical fibers, and the laser device further includes a polarization combiner connected to a third polarization maintaining optical fiber for conveying the transmission laser beam and the reference laser beam to an optical output of the laser device.

15 Claims, 4 Drawing Sheets

(51) Int. Cl.
*H04J 14/06* (2006.01)
*G02B 6/42* (2006.01)
*G02F 1/35* (2006.01)
*H01S 3/23* (2006.01)
*H04B 10/25* (2013.01)
*H04B 10/112* (2013.01)
*H04B 10/293* (2013.01)

(52) U.S. Cl.
CPC ......... *H04B 10/1125* (2013.01); *H04B 10/25* (2013.01); *H04B 10/2935* (2013.01); *H04B 10/503* (2013.01); *H04J 14/06* (2013.01)

(58) Field of Classification Search
USPC .................................................. 398/118–131
See application file for complete search history.

(56) References Cited

U.S. PATENT DOCUMENTS

| | | | | |
|---|---|---|---|---|
| 6,327,063 B1* | 12/2001 | Rockwell | ............. | H04B 10/118 398/122 |
| 6,347,001 B1* | 2/2002 | Arnold | ................ | H04B 10/118 398/122 |
| 6,522,796 B1* | 2/2003 | Ziari | ..................... | G02B 6/105 359/341.3 |
| 7,292,788 B2* | 11/2007 | Triebes | .............. | H04B 10/1125 398/121 |
| 8,014,685 B2* | 9/2011 | Hoshida | ................. | H04B 10/63 398/205 |
| 8,244,138 B2* | 8/2012 | Hoshida | ................. | H04J 14/06 398/152 |
| 8,488,974 B2* | 7/2013 | Agmon | ................ | H04B 10/272 398/152 |
| 9,172,467 B2* | 10/2015 | Ziari | ................ | H01S 3/094073 |
| 9,749,060 B1* | 8/2017 | Wang | ................... | H04B 10/614 |
| 2002/0181075 A1* | 12/2002 | Fidric | ............... | H04B 10/2916 359/334 |
| 2003/0020985 A1* | 1/2003 | LaGasse | ................. | H04J 14/08 398/98 |
| 2003/0206676 A1* | 11/2003 | Ovadia | ................. | G02F 1/0136 385/11 |
| 2004/0179848 A1* | 9/2004 | Belenkii | .............. | H04B 10/112 398/131 |
| 2005/0100339 A1* | 5/2005 | Tegge | ................... | H04B 10/118 398/125 |
| 2006/0056851 A1* | 3/2006 | Takahashi | ............ | H04B 10/118 398/118 |
| 2006/0215171 A1* | 9/2006 | Nakata | ............... | G01B 9/02003 356/487 |
| 2007/0116286 A1* | 5/2007 | Yuan | ...................... | H04L 9/0858 380/256 |
| 2008/0159758 A1* | 7/2008 | Shpantzer | .............. | H04B 10/61 398/214 |
| 2009/0279891 A1* | 11/2009 | Yu | ............................ | H04J 14/06 398/65 |
| 2015/0303986 A1* | 10/2015 | Shi | ....................... | H01Q 3/2682 375/130 |
| 2018/0091230 A1 | 3/2018 | Dolgin et al. | | |

* cited by examiner

LASER DEVICE FOR OPTICAL COMMUNICATION, OPTICAL COMMUNICATION SYSTEM AND USE OF THESE

CROSS-REFERENCE TO RELATED APPLICATIONS

This patent application is a U.S. National Phase of PCT International Application No. PCT/NL2019/050439, filed Jul. 12, 2019, which claims priority to European Application No. 18183154.6, filed Jul. 12, 2018, which are both expressly incorporated by reference in their entireties, including any references contained therein.

FIELD OF THE INVENTION

The present invention is directed at a laser device for optical communication, comprising a first laser unit connected to a first optical fiber for supplying a transmission laser beam to the first optical fiber. The invention is further directed at an optical communication system, and at a use of a laser device as described above or an optical communication system as described above in a free space optical communication method.

BACKGROUND

Optical space communication is regarded to be the new generation technology for high-speed data communication between terminals (in space and near/on ground). Optical space communication (or free-space optical communication) is an optical communication technology that uses light propagating in free space to wirelessly transmit data, for telecommunications or computer networking, between entities such as aircraft, vehicles, buildings, or satellites in orbit around a planet. It may be applied in situations wherein physical networks are absent or not practical, e.g. between entities in difficult terrain, moving objects, or in space. It is typically based on the exchange of laser-light. The light is exchanged between entities having clear line of sight, although it may be relayed one or more times underway in case no clear line of sight is available between the end-points or in order to route and/or to boost the signal.

Optical space communication requires a combination of high-power laser sources with complex opto-mechanical transmitter and receiver systems. The larger the distance between the terminals is, the higher the optical power and complexity of the system are. The latter is related to the pointing stability and accuracy which can be strongly affected by atmospheric disturbances. To achieve and maintain a high pointing stability and accuracy between the transmitting and receiving terminals, many dedicated monitoring and control systems are needed. For bi-directional communication, the conventional approach is to track the direction of the incoming beam and responsively adapt the direction of the outgoing beam e.g. with a fine steering mirror (FSM). This, however, does not allow to monitor the direction of the outgoing beam.

SUMMARY OF THE INVENTION

It is an object of the present invention to obviate the disadvantages experienced with conventional systems and to provide a laser device that enables monitoring of its outgoing direction ill a manner without adding too much complexity to a system wherein it may be applied.

To this end, there is provided an optical communication system for optical space communication, the system comprising a first laser unit connected to a first optical fiber for supplying a transmission laser beam to the first optical fiber, wherein the laser device is configured for providing a reference laser beam in addition to the transmission laser beam, wherein for providing the reference laser beam the laser device further includes a second laser unit connected to a second optical fiber for supplying the reference laser beam to the second optical fiber; wherein the first laser unit is configured for providing the transmission laser beam as a linear polarized beam that is polarized ill a first polarization direction, and wherein the second laser unit is configured for providing the reference laser beam as a linear polarized beam that is polarized in a second polarization direction; and wherein the first optical fiber and the second optical fiber are formed of polarization maintaining optical fibers, and the laser device further includes a polarization combiner connected to a third polarization maintaining optical fiber for conveying the transmission laser beam and the reference laser beam to an optical output of the laser device, while maintaining a mutual difference between the polarization directions of the transmission laser beam and the reference laser beam.

The laser device described above advantageously generates a transmission laser beam and an additional reference laser beam. Both laser beams are linearly polarized, and each linear polarized beam is launched into an optical axis of a respective polarization maintaining optical fiber. Thereafter the beams are combined by a polarization combiner such the linear polarized transmission laser beam and reference laser beam are polarized in mutually different polarization directions. Polarization maintaining optical fibers are used for conveying the combined transmission laser beam and reference laser beam to a same optical output of the laser device. Preferably, orthogonal polarization directions are used for the transmission laser beam and the reference laser beam, which are sent into respective optical axes of the polarization maintaining optical fibers. Therefore, both the transmission laser beam and the reference laser beam are emitted in-line from a same output location/direction. Because their mutual polarization directions are maintained, the reference laser beam may be easily separated from the transmission laser beam with polarization optics to allow tracking of the output direction of the beams. For example, in an optical system the combined laser beam may be sent through steering optics to control the direction of the transmission laser beam, and thereafter the reference laser beam may easily be separated from the transmission laser beam to allow sending of the beam to a tracking system. This enables tracking of the outgoing direction of the transmission laser beam.

Typically, the reference laser beam and the transmission laser beam are much different in terms of optical power transmitted. The optical power of the transmission laser beam must be large enough to allow transmission thereof over a large distance through variable atmospheric conditions, and at the receiving side to enable decomposition of the data transmitted. The reference laser beam may serve for the sole purpose of tracking the direction of the outgoing beam in the optical system from where the transmission beam is transmitted. Due to the fact that the optical power received by the tracking system must be limited to prevent damage to the tracking system, the optical power of the reference beam must be much lower than the desired optical power of the transmission laser beam. If the tracking optics would directly receive the light of the transmission laser beam, this would overexpose or damage the tracking system. Therefore, ideally the optical power of the reference laser beam is much smaller than that of the transmission laser beam. Moreover, it is noted that typically in an optical system for optical space communication, the optical power of the received incoming data beam is also much smaller than the optical power of the transmitted laser beam. This is due to the fact that optical power is lost underway from the transmitter to the receiver as a result of variable atmospheric conditions, divergence of the beam, alignment errors, etcetera. The differences in optical power between the various beams in the optical communication system typically add complexity to the system.

In accordance with some embodiments, the laser device comprises a polarization maintaining optical amplifier arrangement for amplifying an optical energy of at least one of the transmission laser beam or the reference laser beam, a polarization maintaining optical amplifier arrangement comprises at least one of: a first polarization maintaining optical amplifier between the first optical fiber and the polarization combiner; or a second polarization maintaining optical amplifier between the polarization combiner and the optical output; or both said first and said second polarization maintaining optical amplifier; or a multistage polarization maintaining optical amplifier system including at least a first amplification stage and second amplification stage, wherein the first amplification stage provides the first polarization maintaining optical amplifier between the first optical fiber and the polarization combiner, and wherein the second amplification stage provides the second polarization maintaining optical amplifier between the polarization combiner and the optical output.

This optical amplifier arrangement, various embodiments of which are recited above, allows for the reference laser beam to be at a different optical power then the transmission laser beam. In particular, it allows for the amplification of the transmission laser beam independent of the reference laser beam, while enabling the amplification of both beams such as to bring the ratio between optical powers of the transmission laser beam with respect to the reference laser beam in a desired condition. The amplification of the transmission laser beam may be of any gain factor, enabling a large range of various types of laser units to be usable to provide the transmission laser beam. For example in some embodiments, the first laser unit is configured for providing an optical output power of at least 0.1 milliwatt. At the output of the laser device, after full amplification, the transmission laser beam may have an optical power in a range between 500 milliwatt to several tens of watt, preferably between 1 watt and 50 watt. If the first laser unit provides an (unamplified) laser beam having an optical power of 1 milliwatt, the power of the transmission laser beam must therefore be amplified 500 to 50000 times to provide the desired output power. This may be performed in several amplification stages or several amplifier units. For the present invention, it is important that the amplifier units amplify the laser beams in such a way that their mutual polarization differences are maintained, preferably using polarization maintaining optical amplifiers. Multiple stage amplification may be used to first perform a preamplification of the transmission laser beam, thereafter combined the transmission laser beam with the reference laser beam and thereafter perform a post amplification of the combined beam to yield both beams with the desired output power and polarization.

In accordance with some embodiments, the first laser unit is a high power laser unit providing an optical output power of at least 50 milliwatt, for example 100 milliwatt, for enabling to provide the transmission laser beam to the polarization combiner without amplification. In case a high power laser unit is used for providing a laser beam at the optical power indicated, pre-amplification of the transmission laser beam prior to the polarization combiner may no longer be necessary. It may be appreciated, where desired, pre-amplification may still take place in view of for example the application of the laser device in accordance with the invention for certain fields of application where very high power transmission beams are desired.

In accordance with some embodiments, the second laser unit is configured for providing an optical output power that is a fraction a of the optical power of the transmission laser beam provided to the polarization combiner, wherein the fraction a is smaller than 0.1, such that the optical output power of the reference laser beam is one or more orders of magnitude smaller than the optical power of the transmission laser beam at the optical output of the laser device. The fraction a is smaller than 0.1, e.g. 0.0001 or 0.000001 or 0.00000001. The optical power required for the tracker unit for monitoring the direction of the transmission laser beam in an optical system is in the order of microwatt. Therefore, a difference in optical power is considerable, in the order of 10's to 100's, to even 1000's, 10000's, or 10000000's time smaller than the optical power of the transmission laser beam.

In accordance with some embodiments of the laser device, the first laser unit is configured for providing the transmission laser beam at a first wavelength, and wherein the second laser unit is configured for providing the reference laser beam at a second wavelength different from the first wavelength, wherein the laser device, between the polarization combiner and the optical output, comprises an intrinsic fiber optic wavelength dependent filter. Generating the reference laser beam and the transmission laser beam and different wave lengths provides the advantage of enabling additional filtering in order to prevent or suppress cross talk between the beams. For example, by using an in fiber wavelength filter (such as a fiber Bragg grating) transmission laser beam light that may inadvertently leak through in the reference beam after splitting the reference beam from the transmission laser beam by polarization, may effectively be filtered using wavelength and polarization dependent filter in the PM fiber. Such a filter may be used anywhere in the system where light from the transmission laser beam may inadvertently leak through. The wavelength dependent filter may, as described above, include a fiber Bragg grating embedded in a polarization maintaining optical fiber. However, alternative wavelength dependent filter methods may be applied for filtering the light.

In accordance with some embodiments, the laser device further comprises a first optical modulator cooperating with the first laser unit for optically modulating the transmission laser beam dependent on a data signal, such as to convey the data signal by means of the transmission laser beam. The embodiments may in particular be useful for optical communication, where the data is to be conveyed using the transmission laser beam. As may be appreciated, a laser device as described in the present document may likewise be applied in other applications wherein modulation of the laser beam dependent on a data signal may not be desired optical space communication is a preferred field of application, but may not be the only field of application where the present laser device may be used.

In accordance with yet other embodiments, the laser device may further comprise a second optical modulator cooperating with the second laser unit for optically modulating the reference laser beam dependent on a harmonic or coded signal characterized by a reference frequency, such as to enable de-multiplexing of the reference laser beam by means of frequency demodulation or dedicated decoding. In an optical communication system, this may advantageously be applied to distinguish the reference laser beam from an incoming receiver beam. The receiver beam may for example be modulated at a certain data rate, and by modulating the reference laser beam at a different rate, the both beams may be distinguished from each other by using frequency dependent de-multiplexing thereof.

In accordance with further embodiments, the laser device further comprises an optical power controller or attenuator for enabling tuning of an optical power of the reference laser beam. This enables the reference frequency beam to be tuned relative to the optical power of an incoming receiver beam.

In accordance with some embodiments wherein the laser device comprises a polarization maintaining optical amplifier arrangement, the laser device further comprises an optical isolator located between the polarization maintaining optical amplifier arrangement and the optical output. The optical isolator may be applied to avoid back reflection of the laser beam to the optical amplifier, such as to prevent damage thereof.

In accordance with a further aspect of the invention there is provided a laser device for optical communication, comprising a laser unit connected to a first optical fiber for supplying a transmission laser beam to the first optical fiber, wherein the laser device is configured for providing a reference laser beam in addition to the transmission laser beam, wherein the laser device comprises an in-line optical splitter for splitting at least a part of an output optical energy of the laser unit for providing the reference laser beam, the in-line optical splitter being connected with an output thereof to a second optical fiber for supplying the reference laser beam to the second optical fiber; wherein the laser device comprises at least one linear polarizer for providing the transmission laser beam as a linear polarized beam that is polarized in a first polarization direction, and wherein the laser device further comprises at least one further linear polarizer or a polarization modifying element for providing the reference laser beam as a linear polarized beam that is polarized in a second polarization direction; and wherein the first optical fiber and the second optical fiber are formed of polarization maintaining optical fibers, and the laser device further includes a polarization combiner connected to a third polarization maintaining optical fiber for conveying the transmission laser beam and the reference laser beam to an optical output of the laser device. The difference between the laser device of the first aspect and the laser device of the second aspect, is that in the laser device of the second aspect the reference laser beam is obtained by using a part of the optical energy of the first laser unit that provides the transmission laser beam, and thereafter linearly polarizing the obtained reference laser beam with respect to the transmission laser beam. The main advantage is still provided by the mutually different polarization between the transmission laser beam and the reference laser beam, which allows to provide the combined laser beam (including the transmission and reference laser beam) via a same output of the laser device to enable tracking of the output direction in an optical system. As may be appreciated, an advantage of the laser device of the first aspect is that all optical energy from the first laser unit is used for providing the transmission laser beam. However, an advantage of the first laser device of the first aspect is that all optical energy from the first laser unit is used for providing the transmission laser beam. However, an advantage of the laser device in accordance with the second aspect is that no additional laser unit is required in order to provide the reference laser beam. Therefore, dependent on the field of application, and a design of an optical system (such as an optical communication system) wherein the laser device is used, one of the devices in accordance with a first or second aspect may be selected.

In accordance with some embodiments of the invention in accordance with a first or second aspect, the laser device may further comprise a frequency shifter for changing a wavelength of at least one of the transmission laser beam or the reference laser beam. The use of a frequency shifter may be an advantage to obtain the wavelength difference which allows to prevent or suppress cross talk between the reference laser beam and the transmission laser beam, as described above. This is the same effect as using different wavelength in first aspect. Certainly in those cases wherein the wavelength of the transmission laser beam and the reference laser beam is originally equal, such as with the laser device in accordance with a second aspect, the application of a frequency shifter is advantageous to make the system less prone to cross talk.

In accordance with a third aspect, there is provided herewith an optical communication system configured for optical space communication, the optical communication system comprising a laser device according to any one or more of the preceding claims for providing a laser beam, the laser beam including a transmission laser beam part and a reference laser beam part, further including steering optics and a controller cooperating with the steering optics for controlling an outgoing direction of the laser beams, wherein the system further comprises a polarizing beam splitter for splitting the laser beam into a transmission laser beam an a reference laser beam, the transmission laser beam comprising the transmission laser beam part and the reference laser beam comprising the reference laser beam part; further including a tracking unit including an optical sensor, wherein the tracking unit cooperates with the controller for determining the direction of the reference beam, wherein the controller is arranged for establishing the direction of the transmission beam based on the determined direction of the reference beam, for controlling the steering optics.

The optical communication system may use a laser device in accordance with either the first or the second aspect or any embodiments thereof.

In accordance with some embodiments of the third aspect, the optical communication system may further include at least one optical input-output aperture for passing through the outgoing transmission laser beam and for passing through an incoming received optical communication beam, wherein the tracking unit or a further tracking unit is configured for establishing the direction of the incoming received optical communication beam. In these embodiments, both the output direction of the transmission laser beam as well as the direction of the incoming received optical communication beam may be tracked using a tracking unit. The optical communication signal further, in accordance with some embodiments, comprises a wave plate such as to properly condition the incoming and outgoing beam. For example, preferably a quarter wave plate is used to transform the outgoing transmission beam into a circular polarized beam, and coincidentally transform a circularly polarized incoming received optical communication beam into a linearly polarized beam having a linear polarization perpendicular to that of the transmission beam prior to the wave plate. The incoming received beam will then pass the polarizing beam splitter to end up in a same optical branch as the reference beam.

A fourth aspect of the present invention relates to the use of at least one of a laser device described above or an optical communication system as described above in a free space optical communication method for data communication between objects in free space based on exchanging optical data signals using data modulated laser beams. As explained, a laser device in accordance with the present invention may advantageously be applied in such a system.

BRIEF DESCRIPTION OF THE DRAWINGS

The invention will further be elucidated by description of some specific embodiments thereof, making reference to the attached drawings. The detailed description provides examples of possible implementations of the invention, but is not to be regarded as describing the only embodiments falling under the scope. The scope of the invention is defined in the claims, and the description is to be regarded as illustrative without being restrictive on the invention. In the drawings:

DETAILED DESCRIPTION

Figure 1:
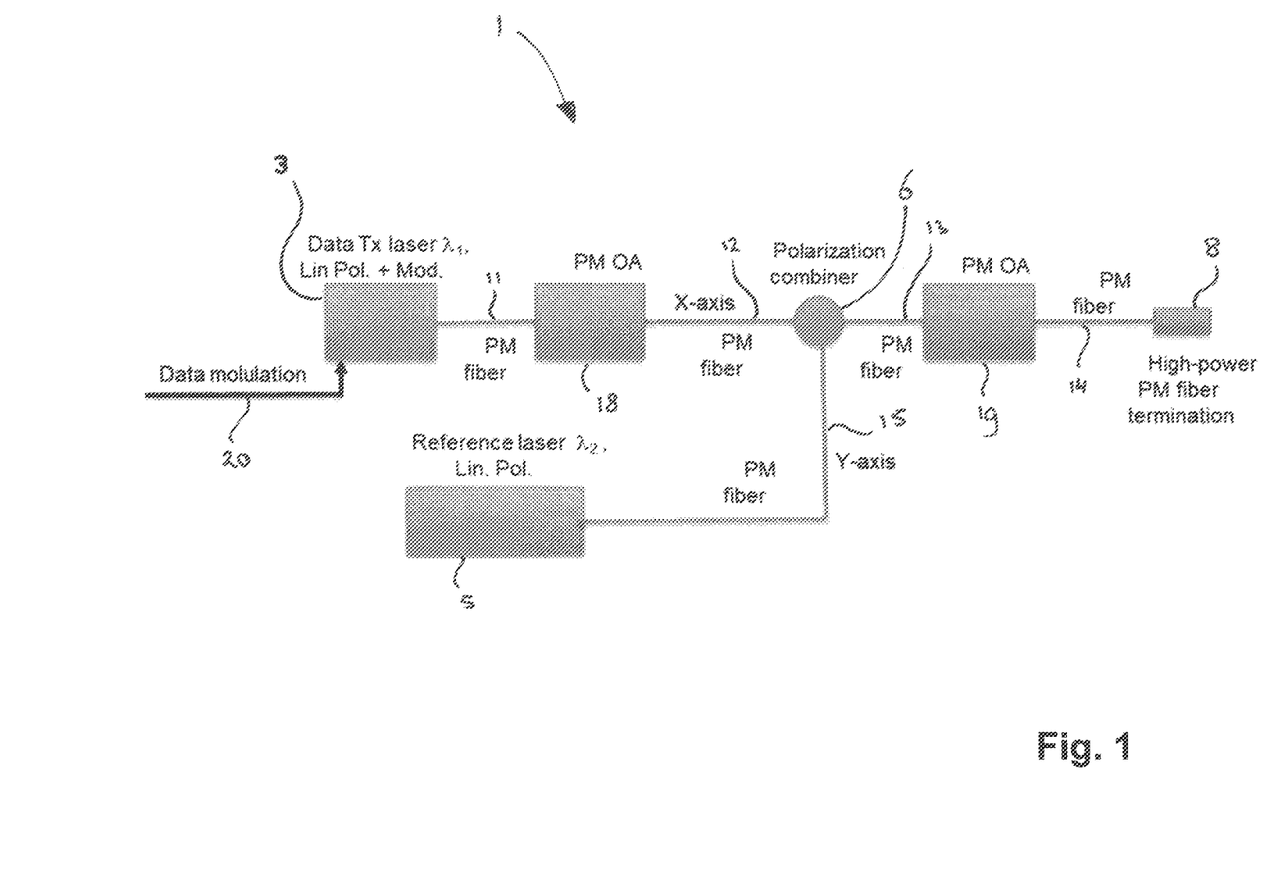
FIG. 1 schematically illustrates a laser device in accordance with an embodiment of the present invention.

FIG. 1 schematically illustrates a laser device 1 in accordance with an embodiment of the present invention. The laser device comprises a first laser unit 3 and a second laser unit 5. The first laser unit 3 is configured for generating a transmission laser beam (Tx) and to supply it to the polarization maintaining optical fiber 11. The laser unit 3 provides a linearly polarized laser beam to be used as transmission laser beam. Thereto, the laser unit 3 may have a linear polarized output or be equipped with a linear polarizer 4 integrated therein. Alternatively, a linear polarizer 4 may be added downstream of the first laser unit 3, for example in between the first laser unit 3 and the polarization maintaining optical fiber 11, or between the optical fiber 11 and the polarization maintaining optical amplifier 18. In the latter case, the optical fiber 11 may not necessarily be formed of a polarization maintaining optical fiber. This is less likely because it will results in variation in the output power level. Laser unit 3 can either be direct modulated or using external modulator 21 to generate the data information.

Figure 4A:
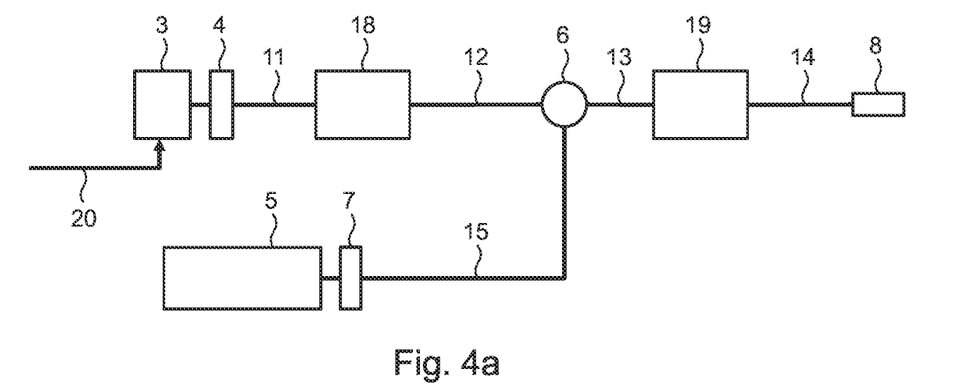
FIGS. 4a to 4c illustrate various alternatives for the laser device of FIG. 1.
Figure 4B:
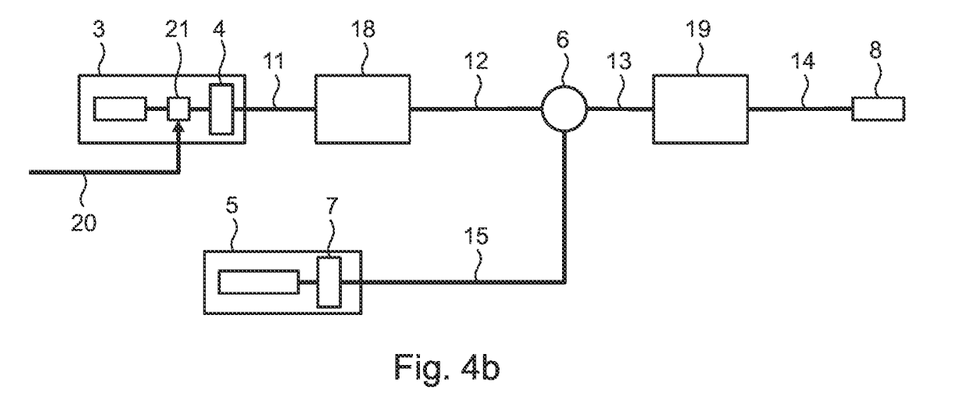
Figure 4C:
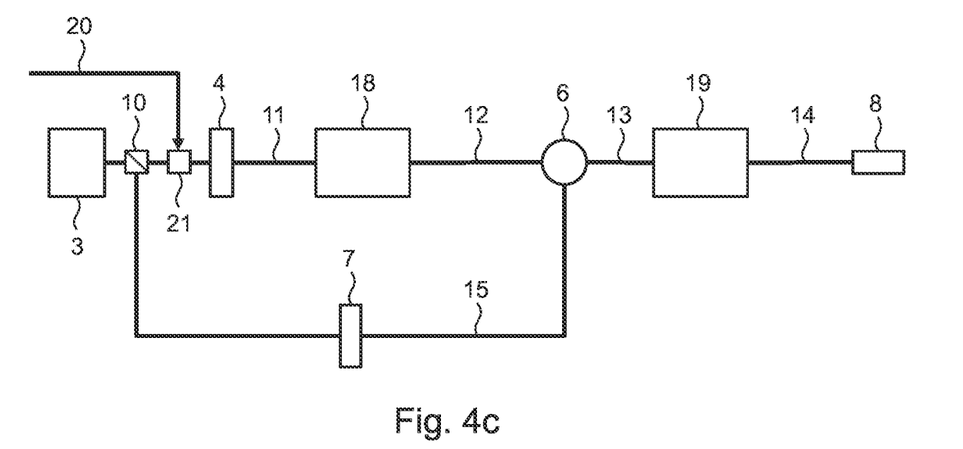

The second laser unit 5 is configured for generating a transmission laser beam (Rf) and to supply it to the polarization maintaining optical fiber 15. Also the second laser unit 5 provides a linearly polarized laser beam, which is to be used as reference laser beam. The second laser unit 5 may likewise be equipped with a linear polarizer 7 integrated therein. Alternatively, a linear polarizer 7 may be added downstream of the second laser unit 5, for example in between the second laser unit 5 and the polarization maintaining optical fiber 15, or between the optical fiber 15 and the polarization combiner 6. In the latter case, the optical fiber 15 may not necessarily be formed of a polarization maintaining optical fiber. Various implementations are illustrated in FIGS. 4a to 4c.

The linear polarization of the first laser unit 3 and the linear polarization of the second laser unit 5 are configured such that the polarization directions are different. This causes the transmission laser beam and the reference laser beam to have a mutually different linear polarization direction, such that these beams may later be separated easily by using polarization dependent optics. Preferably, the polarization directions of the transmission laser beam and the reference laser beam are mutually orthogonal.

The polarization maintaining optical amplifier 18 performs pre-amplification of the transmission laser beam provided by the first laser unit 3. The polarization maintaining optical amplifier 18 is an optional unit in the laser device 1, and may be dispensed with in case the first laser unit 3 provides a high energy beam (e.g. 50 milliwatt or more) and post amplification is sufficient to boost the transmission beam such as to enable optical communication over a desired distance and given the expected variable atmospheric conditions. Whether or not the polarization maintaining optical amplifier 18 is present, the transmission laser beam is conveyed towards a polarization combiner 6 for combining it with the reference laser beam. This is done via polarization maintaining optical fiber 12 in case polarization maintaining optical amplifier 18 is present, otherwise the polarization maintaining optical fiber 11 directly connects to the polarization combiner 6 for example.

The first laser unit 3 further comprises an optical modulator (not shown) that receives the data signal 20 and modulates the optical power of the transmission laser beam accordingly. The optical modulator may be integrated in the first laser unit 3, or may be a separate element downstream of the first laser unit 3. Optionally, another optical modulator may cooperate with the second laser unit 5, for enabling the reference laser beam to be modulated with a harmonic signal at a selected frequency. This frequency may be selected such as to allow the reference laser beam to be distinguishable from another optical signal, such as a received incoming optical beam (Rx) of an optical communication system that is modulated at another frequency or data rate. In that case a frequency dependent de-multiplexer (de-mux) may be applied to separate the two optical signals such as to allow monitoring of their directions separately.

The polarization combiner 6 connects to polarization maintaining optical fibers 12 and 15 at it's inputs. The polarization combiner 6 thereby receives the transmission laser beam and the reference laser beam, and combines these two into a single combined beam. The combined beam includes the orthogonally polarized transmission laser beam and reference laser beam, and is emitted from polarization combiner 6 into polarization maintaining optical fiber 13. The combined beam is thereafter supplied to polarization maintaining optical amplifier 19, wherein both the transmission laser beam and the reference laser beam are amplified. At the output of polarization maintaining optical amplifier 19, the optical power is sufficiently boosted to provide the beams to the high power polarization maintaining fiber terminal, forming the output of the laser device 1. The optical power of the transmission laser beam may be tens to hundreds of watt, e.g. 20 to 500 Watt, for enabling use of the transmission laser beam in an optical space communication system.

The first and second laser units 3 and 5, may emit laser light of a same wavelength $\lambda$. Alternatively, the wavelength $\lambda_1$ of the first laser unit 3 may be different from the wavelength $\lambda_2$ of the second laser unit 5. In embodiments wherein $\lambda_1$ and $\lambda_2$ are different wavelengths, and additional wavelength dependent filter may be added before and/or after the polarization maintaining optical amplifier 19 to suppress cross-talk between the transmission laser beam and the reference laser beam. In case the first and second laser units 3 and 5 emit laser light of a same wavelength, it is nevertheless possible to obtain the transmission laser beam and the reference laser beam having different wavelengths $\lambda_1$ and $\lambda_2$ by using an optical frequency shifter. For example one or both of the optical fibers 11 or 15 may be connected to a frequency shifter for this purpose.

Instead of using different polarization maintaining optical amplifiers 18 and 19, the optical amplifiers 18 and 19 may be provided by different stages of a multi-stage high-power optical amplifier in between which the reference laser light is inserted via the polarization combiner 6. For example, a dual-stage high-power optical amplifier may be applied. As described earlier, in case the first laser unit 3 is powerful enough, for example a 50 mW or a 100 mW laser unit, the pre-amplification provided by the polarization maintaining optical amplifier 18 prior to the polarization combiner 6 may optionally be dispensed with. Similar, dependent on the application, the polarization maintaining optical amplifier 19 may also be made optional. The gain factor provided by the amplifiers may be tuned such as to obtain optical powers for the transmission laser beam and the reference laser beam that are optimized for their purpose. The transmission laser beam must be very powerful to extend the distance range across which communication is possible via optical space communication. The reference laser beam must be limited in optical power to prevent damage to the tracking unit in the optical system wherein it is applied. The optical powers may be a factor 100 to 1000, or even 10000, different—the transmission laser beam being much more powerful than the reference laser beam. Moreover, optical power attenuation or control for the second laser unit may be applied to adapt the optical power of the reference laser beam for the tracking system. Furthermore, at certain locations in the laser device, for example downstream of optical amplifier 19, optical isolator(s) may be added to avoid back reflection of optical energy to the optical amplifiers or to the laser units 3 and 5.

The polarization combiner 6 may be all-fiber based. This is advantageous for small size and to prevent relevant loss of optical energy due to alignment errors. Alternatively, however, micro-optics based combiners or free-space optics based combiners may be applied, although these are less preferred in view of the abovementioned potential loss of optical energy with the use of such elements.

In the embodiment of FIG. 1, the second laser unit 5 is applied for generating the reference laser beam 5. Instead of using a second laser unit 5, alternatively part of the optical power of the first laser unit 3 that generates the transmission laser beam may be separated therefore (e.g. by a beam splitter 10), and may be used to provide the reference laser beam. This optical signal, which will be used to provide the reference laser beam, would have to be linear polarized in a different polarization direction than the transmission laser beam as described above. In case the transmission laser beam provided by the first laser unit is already polarized before part of it is split off, a quarter wave plate or element may be applied prior to optical fiber 15 to rotate the polarization direction with $\pi/2$ radians, such as to become orthogonal to the polarization direction of the transmission laser beam. An alternative is to couple in the polarization maintaining fiber 15 in the proper optical axis to ensure the beams are orthogonally polarized for the polarization combiner 6.

In general, to provide the linear polarized transmission laser beam (Tx) (beam 38 in FIGS. 2 and 3) and reference laser beam (beam 37 in FIGS. 2 and 3), it will be clear that the optical axes of the polarization maintaining components and devices in the different configurations represented by FIG. 1 need to be aligned to each other. Each beam, the transmission beam and the reference beam which are polarized, is to be supplied to an optical axis of a polarization maintaining fiber. After combining the beams in combiner 6, both beams are conveyed via different optical axes of the polarization maintaining optical fiber that conveys it. Thus, for combining, the transmission laser beam is to be supplied to a first optical axis of the polarization maintaining optical fiber 13 arranged after the combiner 6 and the reference laser beam is to be supplied to a second optical axis of the polarization maintaining optical fiber 13.

Figure 2:
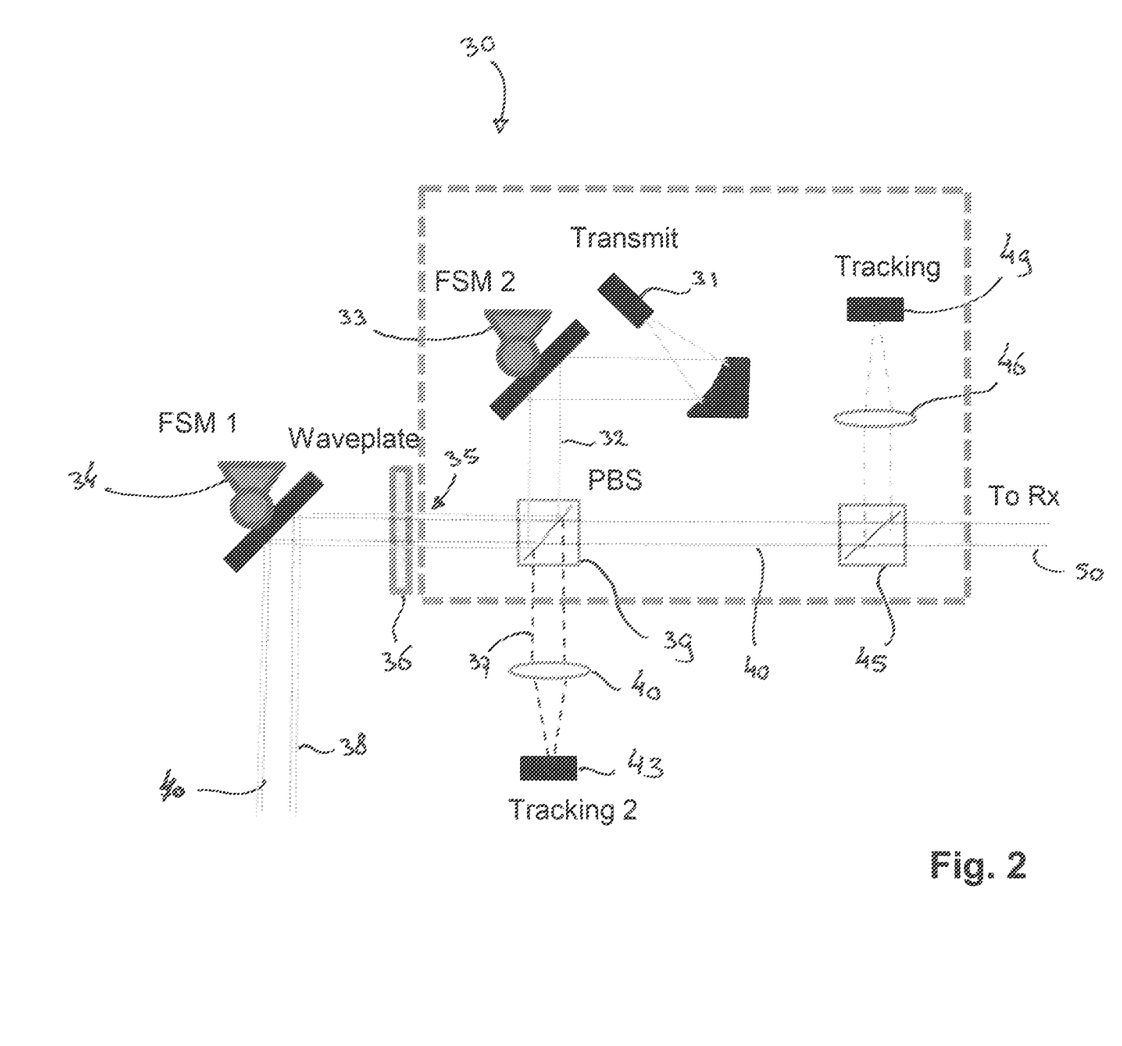
FIG. 2 schematically illustrates an optical communication system in accordance with an embodiment of the present invention.

FIG. 2 schematically illustrates an optical communication system in accordance with the present invention. A laser device as described above is provided as element 31 in the system 30 such as to provide a transmission beam. The laser device 31 provides a combined beam 32 which comprises the reference beam 37 and the transmission laser beam 38. A fine steering mirror (FSM2) 33 is present in the system 30 to control the steering of the output direction of the combined beam 32. The combined beam 32 falls upon a polarizing beam splitter (BBS) 39. The polarizing beam splitter is configured for transmitting a part of the beam on the basis of the polarization direction, while reflecting the other parts of the beam in a different direction. Here, the polarizing beam splitter 39 transmits the reference laser beam 37 while reflecting the transmission laser beam 38 towards the fine steering mirror 1 (FSM1). The reference laser beam 37 is focused using focusing optics 40 onto a tracking system 43. The direction of the reference beam 37 that may be determined using the tracking system 43, is directly indicate of the direction of the outgoing transmission laser beam 38 via the orientation of FSM1.

The function of fine steering mirror 1 (FSM1) 34 is to redirect the outgoing beam 38 towards the receiving terminal for optical communication. An incoming receiver beam 40 follows the same optical path via fine steering mirror 34 in the opposite direction. And aperture at location 35 in the optical system 30 allows the emission of the transmission laser beam 38 and the incoming receiver beam 40. The receiver beam 40 after wave plate 36 has the same linear orientation as the reference laser beam 37, and is therefore transmitted by the polarizing beam splitter 39. The receiver beam 40 thereafter falls onto beam splitter 45 which causes part of the receiver beam 40 to be redirected to the focusing optics 46 towards the tracking system 49 for the receiver beams. The remainder of the receiver beam 50 will be transmitted towards the optical receiver unit that decomposes the data signal from the optical signal 50.

Figure 3:
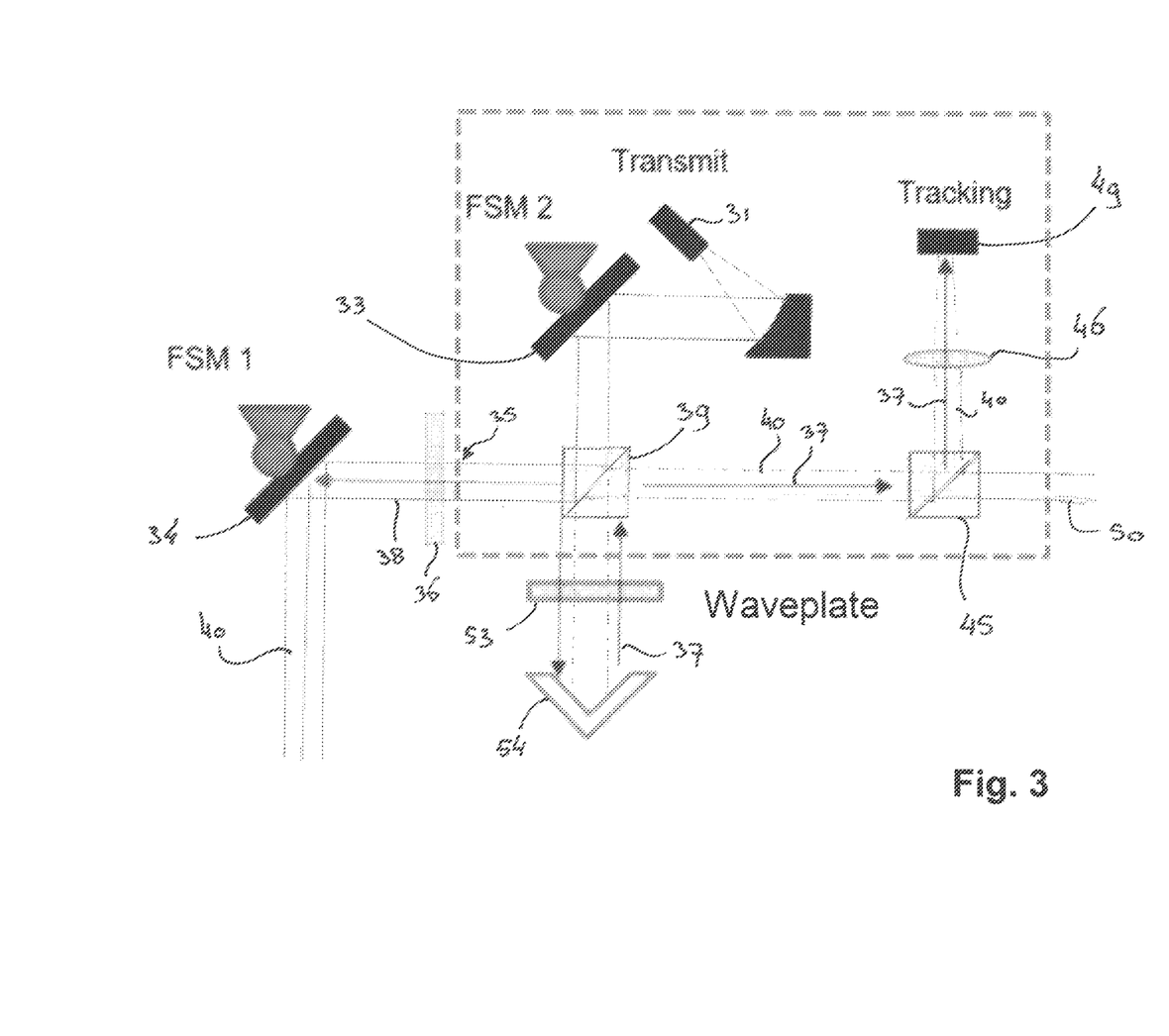
FIG. 3 schematically illustrates an optical communication system in accordance with an embodiment of the present invention.

In the embodiment of FIG. 2, the direction of the reference laser beam 37 and the incoming receiver beam 40 are monitored by different tracking units 43 and 49. In a further embodiment, as illustrated in FIG. 3, a single tracking unit 49 tracks both the direction of the incoming receiver beam 40 and the reference laser beams 37. The optics encountered by the incoming receiver beam 40 are the same as in FIG. 2, and comprise the wave plate 36, the polarizing beam splitter 39, and the beam splitter 45. For the reference laser beam 37, the polarizing beam splitter 39 transmits the reference laser beam 37 towards optical elements 53 and 54.

The transmission laser beam 38 is redirected towards the aperture at location 35 which transmits the transmission laser beam towards the fine steering mirror 34. The reference laser beam 37 is transmitted by polarizing beam splitter 39 towards wave plate 53 and mirror element 54. The wave plate 53 causes the polarization direction of the reference laser beam 37 to be rotated such as to become aligned with the polarization direction of the transmission laser beam 38 when returning to the polarization beam splitter 39. Therefore, the polarizing beam splitter 39 now redirects the received reference laser beam 37 coming from the wave plate 53 towards the beam splitter 45. The beam splitter 45 directs parts of the optical signal to the focusing optics 46 and the tracking unit 49 for monitoring the outgoing direction of the transmission laser beam 38 via the reference beam 37 and of the incoming receiver beam 40. The tracking units 49 and 43 in FIGS. 2 and 3 are connected to a controller (not shown) that receives the directions of the outgoing transmission laser beam 38 and the incoming receiver beam 40. The controller uses this information to control the fine steering mirrors 34 and 33 of the optical system 30 such as to keep the optical system 30 in perfect alignment with the incoming receiver beam 40.

The wave plate 36 is an important element, in certain embodiments, to treat the outgoing and incoming beams. In the present configuration, wave plate 36 is a quarter wave plate, such that the outgoing beam become circular polarized. If the incoming beam 40 is circular polarized in opposite direction, after the wave plate 36, the incoming beam becomes linear polarized with the polarization direction perpendicular to the transmission beam 38. The polarizing beam splitter 39 will therefore transmit (and not redirect) the incoming beam 40, such that it ends up in the same branch as the reference beam 37.

The present invention has been described in terms of some specific embodiments thereof. It will be appreciated that the embodiments shown in the drawings and described herein are intended for illustrated purposes only and are not by any manner or means intended to be restrictive on the invention. It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. Moreover, any of the components and elements of the various embodiments disclosed may be combined or may be incorporated in other embodiments where considered necessary, desired or preferred, without departing from the scope of the invention as defined in the claims.

In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims. The invention may be practiced otherwise then as specifically described herein, and is only limited by the appended claims.

The invention claimed is:

1. An optical communication system configured for optical space communication, the optical communication system comprising:
   a laser device for optical communication comprising a first laser unit optically coupled to a first optical fiber for supplying a transmission laser beam to the first optical fiber, wherein the laser device is configured for providing a reference laser beam in addition to the transmission laser beam,
   wherein, for providing the reference laser beam, the laser device further includes a second laser unit optically coupled to a second optical fiber for supplying the reference laser beam to the second optical fiber;
   wherein the first laser unit is configured for providing the transmission laser beam as a linear polarized beam that is polarized in a first polarization direction, and wherein the second laser unit is configured for providing the reference laser beam as a linear polarized beam that is polarized in a second polarization direction the second polarization direction being different from the first polarization direction; and
   wherein the first optical fiber and the second optical fiber are formed of polarization maintaining optical fibers, and the laser device further includes a polarization combiner for combining the transmission laser beam and the reference laser beam into a combined laser beam, wherein the polarization combiner is optically coupled to a third polarization maintaining optical fiber for conveying the combined beam comprising the transmission laser beam and the reference laser beam to an optical output of the laser device, while maintaining a mutual difference between the first polarization direction and the second polarization direction of the transmission laser beam and the reference laser beam, respectively;
   wherein the optical communication system further comprises:
   steering optics;
   a controller cooperating with the steering optics for controlling an outgoing direction of the combined laser beam; and
   a polarizing beam splitter configured for receiving the combined laser beam for separating the reference laser beam from the transmission laser beam, so as to enable monitoring of the outgoing direction of the transmission laser beam by tracking of the reference laser beam.

2. The optical communication system according to claim 1, wherein in the laser device, the third polarization maintaining optical fiber comprises a first optical axis, and a second optical axis different from the first optical axis, and wherein the transmission laser beam is conveyed in the first optical axis and the reference laser beam is conveyed in the second optical axis.

3. The optical communication system according to claim 2, wherein the laser device further comprises an optical isolator located between the polarization maintaining optical amplifier arrangement and the optical output.

4. The optical communication system according to claim 1, wherein the laser device further comprises a polarization maintaining optical amplifier arrangement for amplifying an optical energy of at least one of the transmission laser beam or the reference laser beam,
wherein the polarization maintaining optical amplifier arrangement comprises at least one of the group consisting of:
a first polarization maintaining optical amplifier between the first optical fiber and the polarization combiner;
a second polarization maintaining optical amplifier between the polarization combiner and the optical output;
both said first polarization maintaining optical amplifier and said second polarization maintaining optical amplifier; and
a multi-stage polarization maintaining optical amplifier system including at least a first amplification stage and a second amplification stage, wherein the first amplification stage provides the first polarization maintaining optical amplifier between the first optical fiber and the polarization combiner, and wherein the second amplification stage provides the second polarization maintaining optical amplifier between the polarization combiner and the optical output.

5. The optical communication system according to claim 1, wherein in the laser device at least one of:
the first laser unit is configured for providing an optical output power of at least 0.01 milliwatt; or
the first laser unit is a high power laser unit providing an optical output power of at least 10 milliwatt, for example 100 milliwatt, for enabling to provide the transmission laser beam to the polarization combiner without amplification.

6. The optical communication system according to claim 5, wherein in the laser device the second laser unit is configured for providing an optical output power that is a factor a times an optical power of the transmission laser beam provided to the polarization combiner, wherein the factor a is smaller than 0.1, such that the optical output power of the reference laser beam is one or more orders of magnitude smaller than the optical power of the transmission laser beam at the optical output of the laser device.

7. The optical communication system according to claim 1, wherein in the laser device the first laser unit is configured for providing the transmission laser beam at a first wavelength,
wherein the second laser unit is configured for providing the reference laser beam at a second wavelength different from the first wavelength, and
wherein the laser device, between the polarization combiner and the optical output, comprises an intrinsic fiber optic wavelength dependent filter.

8. The optical communication system according to claim 7, wherein in the laser device the intrinsic fiber optic wavelength dependent filter includes a fiber bragg grating embedded in a polarization maintaining optical fiber.

9. The optical communication system according to claim 1, wherein the laser device further comprises a first optical modulator cooperating with the first laser unit for optically modulating the transmission laser beam dependent on a data signal, so as to convey the data signal by means of the transmission laser beam.

10. The optical communication system according to claim 1, wherein the laser device further comprises a second optical modulator cooperating with the second laser unit,
wherein the second optical modulator is configured for optically modulating the reference laser beam dependent on at least one of the group consisting of:
a harmonic signal having a reference frequency, so as to enable de-multiplexing of the reference laser beam by means of frequency demodulation; and
a coded signal, so as to enable de-multiplexing of the reference laser beam based on recognition of the coded signal.

11. The optical communication system according to claim 1, wherein the laser device further comprises an optical power controller or attenuator for enabling tuning of an optical power of the reference laser beam.

12. The optical communication system according to claim 1, wherein the laser device further includes a frequency shifter for changing a wavelength of at least one of the transmission laser beam or the reference laser beam.

13. The optical communication system according to claim 1, wherein the polarizing optics include a polarizing beam splitter for splitting the laser beam into a transmission laser beam an a reference laser beam, the transmission laser beam comprising the transmission laser beam part and the reference laser beam comprising the reference laser beam part;
wherein the optical communication system further includes a tracking unit including an optical sensor, wherein the tracking unit cooperates with the controller for determining a direction of the reference beam, and
wherein the controller is arranged for establishing the direction of the transmission beam based on the determined direction of the reference beam, for controlling the steering optics.

14. The optical communication system according to claim 1, further including at least one the group consisting of:
an optical input-output aperture for passing through the outgoing transmission laser beam and for passing through an incoming received optical communication beam, and
a wave plate to condition the outgoing transmission laser beam and the incoming received optical communication beam,
wherein the tracking unit or a further tracking unit is configured for establishing the direction of the incoming received optical communication beam.

15. A use of at least one of an optical communication system according to claim 1 in a free space optical communication method for data communication between objects in free space based on exchanging optical data signals using data modulated laser beams.

* * * * *